(12) United States Patent
Palmas et al.

(10) Patent No.: US 8,563,455 B2
(45) Date of Patent: Oct. 22, 2013

(54) PROCESS FOR REGENERATING CATALYST

(75) Inventors: Paolo Palmas, Des Plaines, IL (US); Daniel R. Johnson, Schaumburg, IL (US)

(73) Assignee: UOP LLC, Des Plaines, IL (US)

(*) Notice: Subject to any disclaimer, the term of this patent is extended or adjusted under 35 U.S.C. 154(b) by 393 days.

(21) Appl. No.: 12/894,869

(22) Filed: Sep. 30, 2010

(65) Prior Publication Data
US 2012/0083404 A1    Apr. 5, 2012

(51) Int. Cl.
*B01J 38/12* (2006.01)
*B01J 38/04* (2006.01)
*B01J 38/40* (2006.01)
*B01J 38/30* (2006.01)
*B01J 38/34* (2006.01)

(52) U.S. Cl.
USPC ............ 502/38; 502/20; 502/34; 502/39; 502/41; 502/43; 502/49

(58) Field of Classification Search
USPC ...................................... 502/20–56
See application file for complete search history.

(56) References Cited

U.S. PATENT DOCUMENTS

| | | |
|---|---|---|
| 4,425,301 A | 1/1984 | Vickers |
| 4,444,722 A | 4/1984 | Owen |
| 4,849,091 A | 7/1989 | Cabrera |
| 5,062,945 A | 11/1991 | Pappal |
| 6,809,054 B1 | 10/2004 | Myers et al. |
| 7,026,262 B1 | 4/2006 | Palmas |
| 7,153,479 B2 | 12/2006 | Peterson |
| 7,517,500 B2 * | 4/2009 | Lomas ...................... 422/139 |
| 7,585,470 B2 | 9/2009 | Hedrick |
| 7,744,744 B1 | 6/2010 | Palmas et al. |
| 7,758,820 B2 | 7/2010 | Mehlberg et al. |
| 7,799,287 B2 | 9/2010 | Hedrick et al. |
| 2009/0152167 A1 | 6/2009 | Sandacz |
| 2010/0080741 A1 | 4/2010 | Couch et al. |

OTHER PUBLICATIONS

U.S. Appl. No. 12/894,925, filed Sep. 30, 2010, Palmas et al.

* cited by examiner

*Primary Examiner* — Kaj K Olsen
*Assistant Examiner* — Jennifer Smith
(74) *Attorney, Agent, or Firm* — James C. Paschall

(57) ABSTRACT

Disclosed is a catalyst distributor and process for mixing spent catalyst and recycled regenerated catalyst in a regenerator vessel. Mixing is conducted in a confined space to which catalyst is delivered from catalyst conduits protruding through the wall of the regenerator.

10 Claims, 3 Drawing Sheets

PROCESS FOR REGENERATING CATALYST

BACKGROUND OF THE INVENTION

The field of the invention is the distribution of catalyst in a catalyst regenerator vessel.

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds, substantial amounts of highly carbonaceous material referred to as coke is deposited on the catalyst. A high temperature regeneration operation within a regenerator zone combusts coke from the catalyst. Catalyst containing coke, referred to herein as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone.

A common objective of these configurations is maximizing product yield from the reactor while minimizing operating and equipment costs. Optimization of feedstock conversion ordinarily requires essentially complete removal of coke from the catalyst. This essentially complete removal of coke from catalyst is often referred to as complete regeneration. Complete regeneration produces a catalyst having less than 0.1 and preferably less than 0.05 wt-% coke. In order to obtain complete regeneration, the catalyst has to be in contact with oxygen for sufficient residence time to permit thorough combustion.

Conventional regenerators typically include a vessel having a spent catalyst inlet, a regenerated catalyst outlet and a combustion gas distributor for supplying air or other oxygen-containing gas to the bed of catalyst that resides in the vessel. Cyclone separators remove catalyst entrained in the flue gas before the gas exits the regenerator vessel.

Complete catalyst regeneration can be performed in a dilute phase fast fluidized combustion regenerator. Spent catalyst is added to a lower chamber and is transported upwardly by air under fast fluidized flow conditions while completely regenerating the catalyst. The regenerated catalyst is separated from the flue gas by a primary separator upon entering into an upper chamber in which regenerated catalyst and flue gas are further separated. Regenerated catalyst from the upper chamber is transported to the lower chamber by a recycled catalyst conduit to assist in heating the spent catalyst.

Oxides of nitrogen ($NO_X$) are usually present in regenerator flue gases but should be minimized because of environmental concerns. Production of $NO_X$ is undesirable because it reacts with volatile organic chemicals and sunlight to form ozone. Regulated $NO_X$ emissions generally include nitric oxide (NO) and nitrogen dioxide ($NO_2$), but the FCC process can also produce $N_2O$. In an FCC regenerator, $NO_X$ is produced almost entirely by oxidation of nitrogen compounds originating in the FCC feedstock and accumulating in the spent catalyst. At FCC regenerator operating conditions, there is negligible $NO_X$ production associated with oxidation of $N_2$ from the combustion air. Low excess air in the regenerator is often used by refiners to keep $NO_X$ emissions low.

After burn is a phenomenon that occurs when hot flue gas that has been separated from regenerated catalyst contains carbon monoxide that combusts to carbon dioxide. The catalyst that serves as a heat sink no longer can absorb the heat thus subjecting surrounding equipment to higher temperatures and perhaps creating an atmosphere conducive to the generation of nitrous oxides. Incomplete combustion to carbon dioxide can result from poor fluidization or aeration of the spent catalyst in the regenerator vessel or poor distribution of spent catalyst into the regenerator vessel.

To avoid after burn, many refiners have carbon monoxide promoter (CO promoter) metal such as costly platinum added to the FCC catalyst to promote the complete combustion to carbon dioxide before separation of the flue gas from the catalyst at the low excess oxygen required to control $NO_X$ at low levels. While low excess oxygen reduces $NO_X$, the simultaneous use of CO promoter often needed for after burn control can more than offset the advantage of low excess oxygen. The CO promoter decreases CO emissions but increases $NO_X$ emissions in the regenerator flue gas.

On the other hand, many refiners use high levels of CO promoter and high levels of excess oxygen to accelerate combustion and reduce afterburning in the regenerator, especially when operating at high throughputs. These practices may increase $NO_X$ by up to 10-fold from the 10-30 ppm possible when no platinum CO promoter is used and excess $O_2$ is controlled below 0.5 vol-%.

When catalyst is not thoroughly, evenly distributed in the regenerator, high temperature differentials can occur across the cross section of the regenerator vessel. Hot spots can occur in some sections of the vessel which can cause damage to nearby equipment. The cooler sections of catalyst may avoid combustion at the same rate as other sections which may allow excess oxygen to travel to the upper vessel to raise the risk of afterburn as well as insufficiently regenerated catalyst.

Improved methods are sought for preventing after burn and generation of nitrous oxides. Even distribution of catalyst and combustion gas in a regenerator promotes more uniform temperatures and catalyst activity fostering more efficient combustion of coke from catalyst.

SUMMARY OF THE INVENTION

In a process embodiment, the subject invention comprises a process for regenerating catalyst comprising delivering spent catalyst having coke deposits to a regenerator vessel. Oxygen is distributed to a regenerator vessel. Oxygen is contacted with spent catalyst to combust coke deposits from the spent catalyst to produce regenerated catalyst and flue gas. The flue gas is separated from the regenerated catalyst and the regenerated catalyst is recycled to a cup in the regenerator vessel. Lastly, spent catalyst is mixed with regenerated catalyst in the cup.

In an additional process embodiment, the subject invention comprises a process for regenerating catalyst comprising mixing spent catalyst having coke deposits and regenerated catalyst in a confined volume in a regenerator vessel to raise the temperature of the spent catalyst. The mixed catalyst is allowed to exit from the confined volume. Oxygen is distributed to a regenerator vessel. The oxygen is contacted with the mixed catalyst to combust coke deposits from the spent catalyst in the mixed catalyst to produce regenerated catalyst and flue gas. The flue gas is separated from the regenerated catalyst, and regenerated catalyst is recycled to the confined volume in the regenerator vessel.

In an additional process embodiment, the subject invention comprises a process for regenerating catalyst comprising delivering spent catalyst having coke deposits and regenerated catalyst to a cup in a regenerator vessel. The spent catalyst is mixed with regenerated catalyst in the cup to provide mixed catalyst. Oxygen is distributed to a regenerator vessel below the cup. Mixed catalyst is allowed to descend from the cup. Spent catalyst is contacted with oxygen to combust coke deposits from the spent catalyst to produce regenerated catalyst and flue gas. Flue gas is separated from the regenerated catalyst. Lastly, regenerated catalyst is recycled to a cup in the regenerator vessel.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

DETAILED DESCRIPTION OF THE INVENTION

The subject invention is an apparatus and process for mixing spent and recycled regenerated catalyst in a confined volume in the regenerator vessel. By mixing hotter recycled catalyst with cooler spent catalyst in the confined volume of a mixer, uniform catalyst temperature is maintained through the regenerator.

Figure 1:
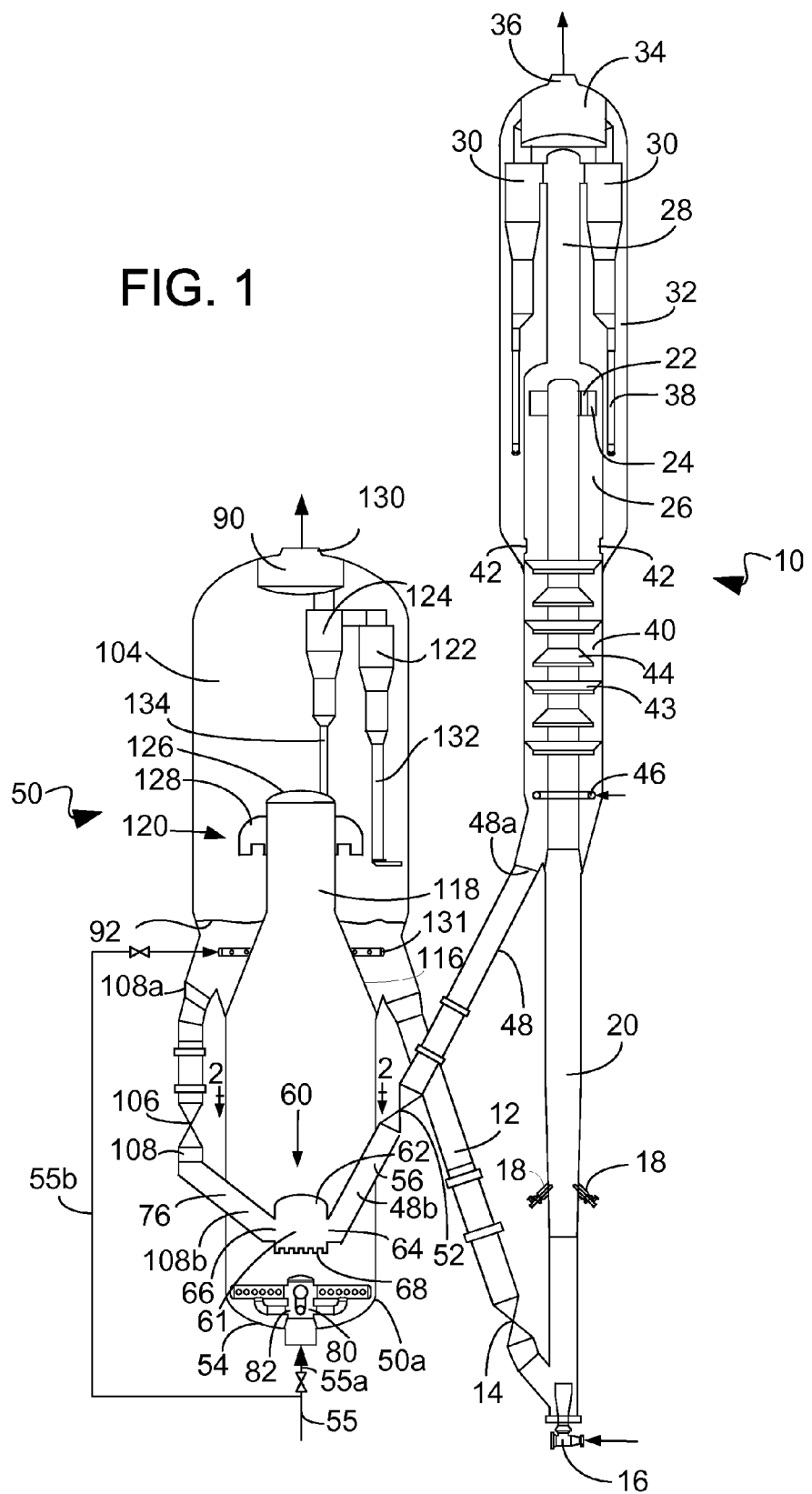
FIG. 1 is a schematic, elevational view of an FCC unit incorporating the present invention.

Although other uses are contemplated, the process and apparatus of the present invention may be embodied in an FCC unit. FIG. 1 shows an FCC unit that includes a reactor section 10 and a regenerator vessel 50. A regenerated catalyst conduit 12 transfers regenerated catalyst from the regenerator vessel 50 at a rate regulated by a control valve 14 to a riser 20 of the reactor section 10. A fluidization inert gaseous medium such as steam from a nozzle 16 transports regenerated catalyst upwardly through the riser 20 at a relatively high density until a plurality of feed injection nozzles 18 inject hydrocarbon feed across the flowing stream of catalyst particles. The catalyst contacts the hydrocarbon feed cracking it to produce smaller, cracked hydrocarbon products while depositing coke on the catalyst to produce spent catalyst.

A conventional FCC feedstock or higher boiling hydrocarbon feedstock are suitable feeds. The most common of such conventional feedstocks is a "vacuum gas oil" (VGO), which is typically a hydrocarbon material having a boiling range of from 343 to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons and the foregoing list is not comprehensive.

The resulting mixture continues upwardly through the riser 20 to a top at which a plurality of disengaging arms 22 tangentially and horizontally discharge the mixture of gas and catalyst from a top of the riser 20 through ports 24 into a disengaging vessel 26 that effect separation of gases from the catalyst. A transport conduit 28 carries the hydrocarbon vapors, including stripped hydrocarbons, stripping media and entrained catalyst to one or more cyclones 30 in a reactor vessel 32 which separate spent catalyst from the hydrocarbon vapor stream. The reactor vessel 32 may at least partially contain the disengaging vessel 26 and the disengaging vessel 26 is considered part of the reactor vessel 32. A collection chamber 34 in the reactor vessel 32 gathers the separated hydrocarbon vapor streams from the cyclones 30 for passage to an outlet nozzle 36 and eventually into a fractionation recovery zone (not shown). Diplegs 38 discharge catalyst from the cyclones 30 into a lower portion of the reactor vessel 32 that eventually passes the catalyst and adsorbed or entrained hydrocarbons into a stripping section 40 of the reactor vessel 32 across ports 42 defined in a wall of the disengaging vessel 26. Catalyst separated in the disengaging vessel 26 passes directly into the stripping section 40. The stripping section 40 contains baffles 43, 44 or other equipment to promote mixing between a stripping gas and the catalyst. The stripping gas enters a lower portion of the stripping section 40 through a conduit to one or more distributors 46. The spent catalyst leaves the stripping section 40 of the reactor vessel 32 through a reactor catalyst conduit 48 which delivers it to the regenerator vessel 50 at a rate regulated by a control valve 52. The spent catalyst from the reactor vessel 32 usually contains carbon in an amount of from 0.2 to 2 wt-%, which is present in the form of coke. Although coke is primarily composed of carbon, it may contain from 3 to 12 wt-% hydrogen as well as sulfur and other materials. The reactor catalyst conduit 48 with an inlet 48a in downstream communication with the reactor vessel 32 may deliver spent catalyst to the regenerator vessel 50.

FIG. 1 shows an embodiment of a regenerator vessel 50 that is a combustor type of regenerator, which may use hybrid turbulent bed-fast fluidized conditions in a high-efficiency regenerator vessel 50 for completely regenerating spent catalyst. However, other catalyst regenerators may be suitable applications for the present invention. Spent catalyst regulated by control valve 52 descends in the reactor catalyst conduit 48 and enters a lower or first chamber 54 of the combustor regenerator vessel 50 through catalyst inlet 56. Reactor catalyst conduit 48 delivers spent catalyst to a catalyst mixer 60.

Oxygen-containing combustion gas, typically air, from combustion gas line 55 is primarily delivered to the regenerator vessel 50 by a combustion gas distributor 80 below the catalyst mixer 60. In an embodiment, combustion gas distributor 80 distributes most of the combustion gas to the regenerator vessel 50 and is fed by a distributor gas line 55a from combustion gas line 55.

Figure 2:
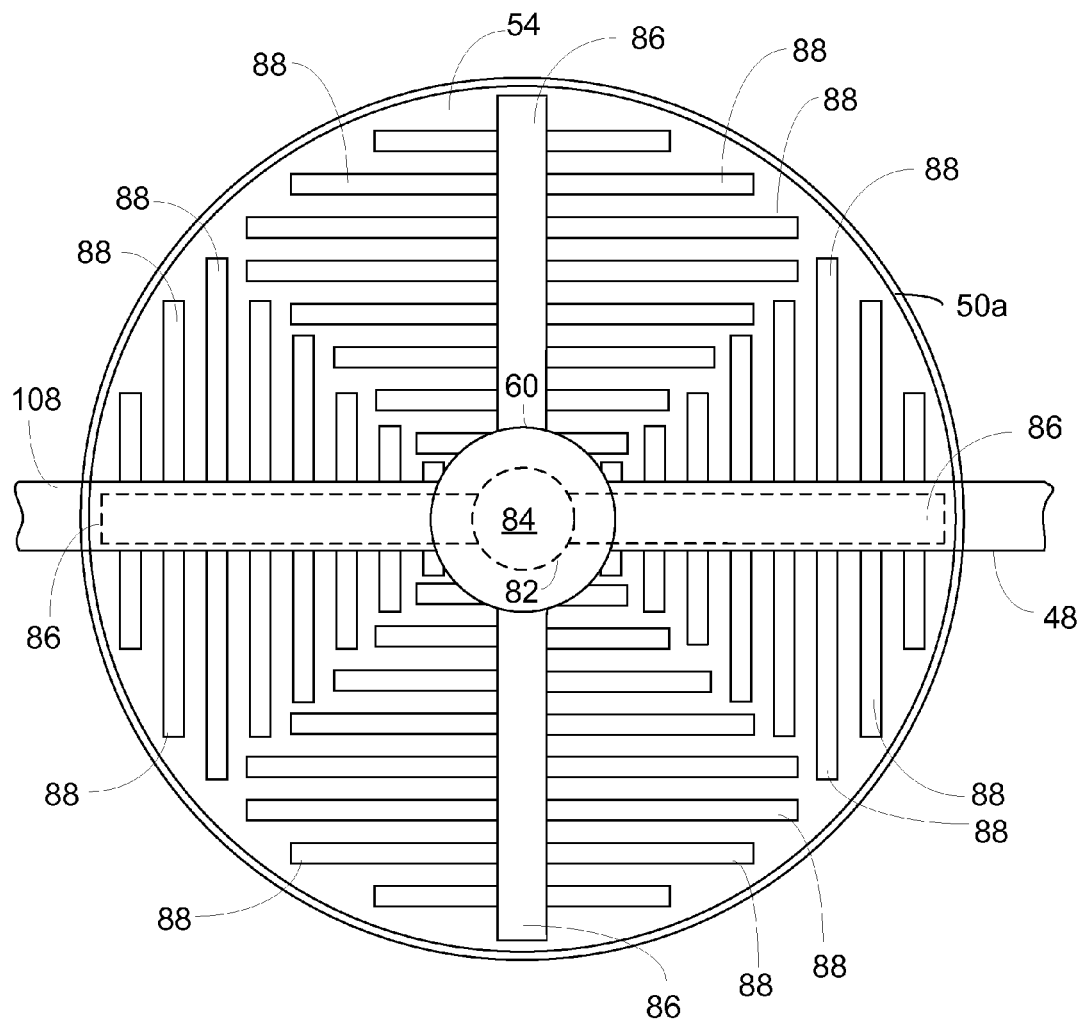
FIG. 2 is a sectional view taken along segment 2-2 in FIG. 1.

A sectional view of the lower chamber 54 is shown in FIG. 2 taken along segment 2-2 in FIG. 1. The reactor catalyst conduit 48, the mixer 60 and recycle catalyst conduit 108 obscure the combustion gas distributor 80, so parts of it are shown in phantom. The distributor includes a riser 82 shown in phantom in FIG. 2 which receives combustion gas from line 55a as shown in FIG. 1. The riser has an upper end that terminates in a cap 84 that is typically impermeable to gas flow. Branches 86 radiating from the riser 82 carry combustion gas to a plurality of flutes 88. Apertures (not shown) in the flutes 88 are arranged to emit combustion gas equally to the entire cross section of the regenerator vessel 50. Consequently, the combustion gas distributor typically distributes no combustion gas to the central region of the lower chamber 54.

Turning back to FIG. 1, the combustion gas distributor 80 distributes gas from distributor gas line 55a to the lower chamber 54 of the regenerator vessel. The oxygen in the combustion gas contacts the spent catalyst and combusts carbonaceous deposits from the catalyst to regenerate the catalyst and generate flue gas. The rising combustion gas and produced flue gas lifts the catalyst at a superficial velocity of combustion gas in the lower chamber 54 of at least 1.1 m/s (3.5 ft/s) under fast fluidized flow conditions. In an embodiment, flow conditions in the lower chamber 54 will include a catalyst density of from 48 to 320 kg/m$^3$ (3 to 20 lb/ft$^3$) and a superficial gas velocity of 1.1 to 2.2 m/s (3.5 to 7 ft/s).

If air is the combustion gas, typically 13-15 kg (lbs) of air is required per kilogram (pound) of coke fed on catalyst to the regenerator. The temperature of the regenerator vessel 50 is about 500 to 900° C. (932° to 1652° F.) and usually about 600 to 750° C. (1112° to 1382° F.). Pressure in the regenerator vessel 50 is preferably 173 to 414 kPa (gauge) (25 to 60 psig). The superficial velocity of the combustion gas is typically less than 1.7 m/s (5.5 ft/s) and the density of the dense bed is typically greater than 320 kg/m$^3$ (20 lb/ft$^3$) depending on the characteristics of the catalyst.

During combustion, the mixture of catalyst and gas in the lower chamber 54 ascend through a frustoconical transition section 116 to the transport, riser section 118 of the lower chamber 54. The riser section defines a tube and extends upwardly from the lower chamber 54. The mixture of catalyst and gas travels at a higher superficial gas velocity than in the lower chamber 54 due to the reduced cross-sectional area of the riser section 118 relative to the cross-sectional area of the lower chamber 54 below the transition section 116. Hence, the superficial gas velocity will usually exceed about 2.2 m/s (7 ft/s). The riser section 118 will have a relatively lower catalyst density of less than about 80 kg/m$^3$ (5 lb/ft$^3$).

The regenerated catalyst and flue gas are transported from the first or lower chamber 54 into a second or upper chamber 104. The mixture of catalyst particles and flue gas is discharged from an upper portion of the riser section 118 into the upper chamber 104 which is in downstream communication with the lower chamber 54. Substantially completely regenerated catalyst may exit the top of the riser section 118, but arrangements in which partially regenerated catalyst exits from the lower chamber 54 are also contemplated. Discharge is effected through a disengaging device 120 that separates a majority of the regenerated catalyst from the flue gas upon entry into the second chamber 104. Initial separation of catalyst upon exiting the riser section 118 minimizes the catalyst loading on cyclone separators 122, 124 or other downstream devices used for the essentially complete removal of catalyst particles from the flue gas, thereby reducing overall equipment costs. In an embodiment, catalyst and gas flowing up the riser section 118 impact a top elliptical cap 126 of the riser section 118 and reverse flow. The catalyst and gas then exit through downwardly directed openings in radial disengaging arms 128 of the disengaging device 120. The sudden loss of momentum and downward flow reversal cause at least about 70 wt-% of the heavier catalyst to fall to the dense catalyst bed 92 and the lighter flue gas and a minor portion of the catalyst still entrained therein to ascend upwardly in the upper or second chamber 104. Downwardly falling, disengaged catalyst collects in the dense catalyst bed 92. Catalyst densities in the dense catalyst bed 92 are typically kept within a range of from about 640 to about 960 kg/m$^3$ (40 to 60 lb/ft$^3$).

A fluidizing gas line 55b delivers fluidizing gas to the dense catalyst bed 92 through a fluidizing distributor 131. Fluidizing gas may be combustion gas, typically air, and may branch from combustion gas line 55. In combustor regenerator vessel 50, in which full combustion of coke is effected in the lower chamber 54, approximately no more than 2 wt-% of the total gas requirements within the process enters the dense catalyst bed 92 through the fluidizing distributor 131 with the remainder being added to the lower chamber 54. In this embodiment, gas is added to the upper chamber 104 not for combustion purposes, but only for fluidizing purposes, so the catalyst will fluidly exit through the catalyst conduits 108 and 12.

If air is the combustion gas, typically 13 to 15 kg (lbs) of air is required per kilogram (pound) of coke fed on catalyst to the regenerator. The combustor regenerator vessel 50 typically has a temperature of about 593° to about 704° C. (1100 to 1300° F.) in the lower chamber 54 and about 649 to about 760° C. (1200 to 1400° F.) in the upper chamber 104. Pressure may be between 173 and 414 kPa (gauge) (25 to 60 psig) in both chambers.

The combined flue and fluidizing gas and entrained particles of catalyst enter one or more separation means, such as the cyclone separators 122, 124, which separates catalyst fines from the gas. Flue gas, relatively free of catalyst is collected in a collector 90 and is withdrawn from the combustor regenerator vessel 50 through an exit conduit 130 while recovered catalyst is returned to the dense catalyst bed 92 through respective diplegs 132, 134. Catalyst from the dense catalyst bed 92 is transferred through the regenerated catalyst conduit 12 back to the reactor section 10 where it again contacts feed as the FCC process continues.

In an embodiment, to accelerate combustion of the coke in the lower chamber 54, hot regenerated catalyst from a dense catalyst bed 92 in an upper or second chamber 104 may be recycled into the lower chamber 54 via an external recycle catalyst conduit 108 regulated by a control valve 106. Hot regenerated catalyst enters an inlet 108a of recycle catalyst conduit 108 which is in downstream communication with the upper chamber 104. Recycled regenerated catalyst enters the lower chamber 54 through regenerated catalyst inlet 76.

The reactor catalyst conduit 48 may extend to and communicate with the catalyst mixer 60. The outlet end of the reactor catalyst conduit 48 may be in upstream communication with a catalyst mixer 60 in the lower chamber 54. A predominant portion of the reactor catalyst conduit 48 is disposed above the catalyst mixer 60. A segment 48b in the reactor catalyst conduit 48 may protrude through a vertical wall 50a of the regenerator vessel 50. Spent catalyst enters the catalyst mixer 60 through an entrance 64 in downstream communication with the catalyst inlet 56. The entrance 64 may simply be an opening in the side of the cup 62 which may correspond to the inner diameter of the respective conduits 48.

The recycle catalyst conduit 108 may extend to the catalyst mixer 60. The outlet end of the recycle catalyst conduit may be in upstream communication with a catalyst mixer 60 in the lower chamber 54. A predominant portion of the recycle catalyst conduit 108 is disposed above the catalyst mixer 60. A segment 108b in the reactor catalyst conduit 48 may protrude through a vertical wall 50a of the regenerator vessel 50. Recycled, regenerated catalyst enters the catalyst mixer 60 through an entrance 66 in downstream communication with a catalyst inlet 76. The entrance 66 may simply be an opening in the side of the cup 62 which may correspond to the inner diameter of the respective conduits 108.

The mixer 60 defines a confined volume 61 in which spent catalyst having coke deposits and regenerated catalyst are mixed in the regenerator vessel 50 to raise the temperature of the spent catalyst. In an aspect, mixed catalyst is allowed to exit downwardly from the confined volume 61. In an aspect, the mixer 60 is located in the lower chamber 54 of the regenerator. The mixer 60 may comprise a cup 62 defining the confined volume 61. The cup 62 may be inverted to have a closed upper end and an open lower end and may define a cylinder. The cup 62 may have a cylindrical wall. The closed upper end may be a cap or a dome enclosing the cylindrical wall while the open lower end may be an opening defined by the cylindrical wall. A catalyst conduit may extend to the cup 62 to deliver catalyst to the cup. In an aspect, the reactor catalyst conduit 48 extends to the cup 62 to deliver spent catalyst to the cup 62. In a further aspect, the recycle catalyst conduit 108 may extend to the cup to deliver recycled regenerated catalyst to the cup 62. Spent catalyst and recycled regenerated catalyst may be mixed in the cup. The entrance 64 may be diametrically opposed to the entrance 66. One or both of the entrances 64 and 66 may be tangentially oriented with respect to the cylinder defined by the cup to generate a mixing vortex upon entry into the mixing volume. The bottom of the cup may have a serrated or dentated lower edge 68 to break gas bubbles that may descend and rise around the lower edge to prevent uneven distribution.

In the mixer 60, spent catalyst from reactor catalyst conduit 48 mixes with regenerated catalyst recycled to the mixer 60 from recycle catalyst conduit 108. Mixing hot regenerated catalyst from recycle catalyst conduit 108 with relatively cool spent catalyst from the reactor catalyst conduit 48 entering the lower chamber 54 raises the overall temperature of the catalyst and gas mixture in the lower chamber 54. By mixing the recycled and spent catalyst in a confined volume 61 in mixer 60, the temperature differential of catalyst in the regenerator is diminished because catalyst temperature is maintained at a uniform temperature throughout the lower chamber 54. The catalyst mixer 60 distributes the mixed catalyst to the lower chamber 54 of combustor regenerator vessel 50.

In an aspect, the cup may be disposed above the combustion gas distributor 80, and the open end of the cup 62 may face the combustion gas distributor 80. Oxygen may be distributed to the regenerator vessel below the cup 62. The pre-mixing of the spent and regenerated catalyst provides a uniform mixture of spent and regenerated catalyst and therefore a uniform temperature profile throughout the cross section of the lower chamber 54.

The mixed regenerated and spent catalyst exit from the cup. In an aspect, the mixed catalyst is allowed to exit from the cup 62 downwardly. The combustion gas from distributor 80 contacts the mixed catalyst descending from catalyst mixer 60 and combusts coke deposits from the spent catalyst to produce regenerated catalyst and flue gas.

Figure 3:
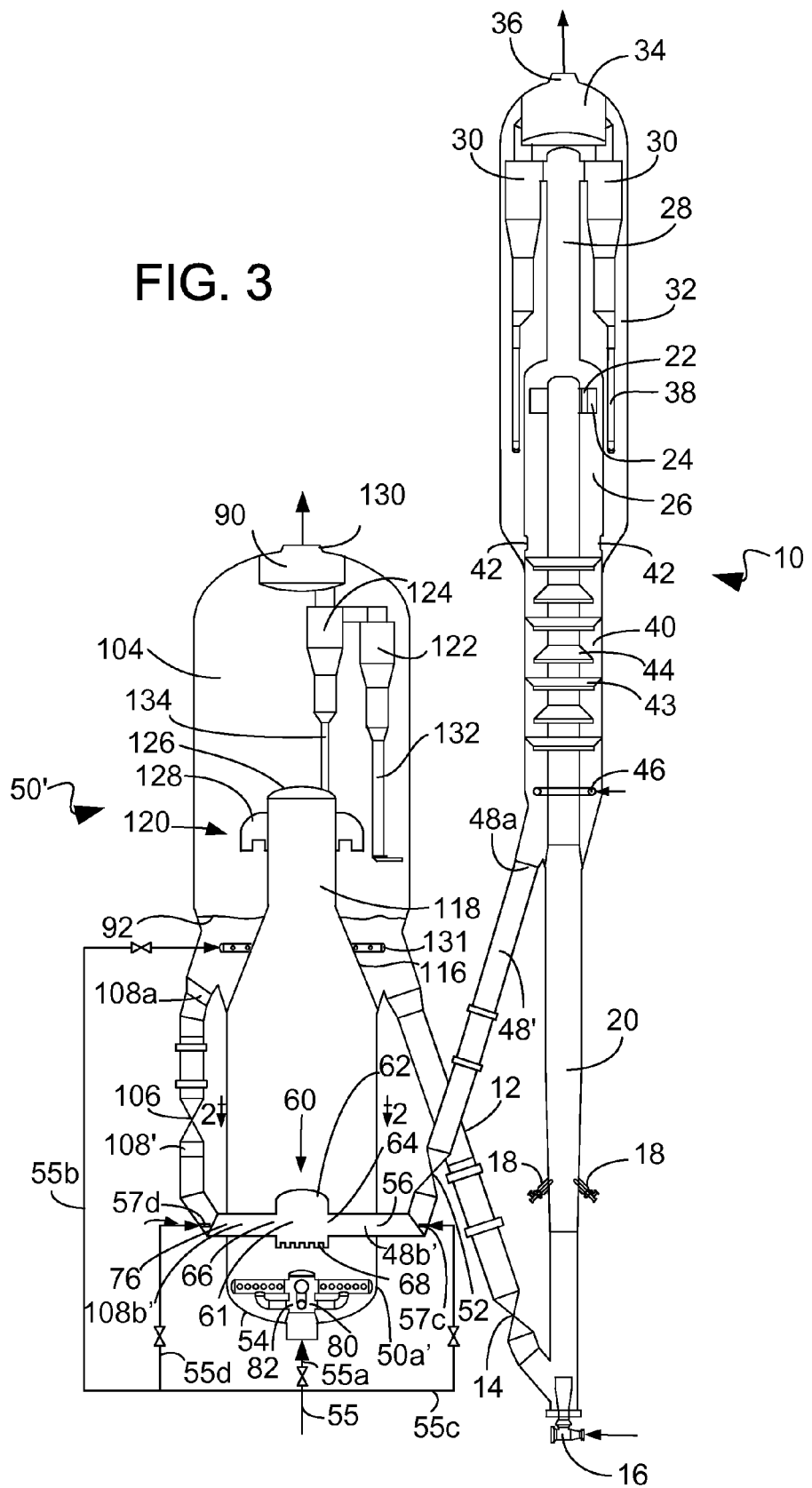
FIG. 3 is a schematic, elevational view of an FCC unit incorporating an alternative embodiment of the present invention.

FIG. 3 shows an embodiment of a regenerator vessel 50' which may be more ideal for a revamp situation than the embodiment in FIG. 1. Elements in FIG. 3 with the same configuration as in FIG. 1 will have the same reference numeral as in FIG. 1. Elements in FIG. 3 which have a different configuration as the corresponding element in FIG. 1 will have the same reference numeral but designated with a prime symbol ('). The configuration and operation of the embodiment of FIG. 3 is essentially the same as in FIG. 1.

In FIG. 3, the segment 48b' may bend from the rest of the conduit 48' and may extend horizontally or at a smaller angle relative to horizontal than the rest of the conduit 48' as it protrudes through the vertical wall 50a' and extends to the entrance 64 to the cup 62. Similarly, the segment 108b' may bend from the rest of the conduit 108' and may extend horizontally or at a smaller angle relative to horizontal than the rest of the conduit 108' as it protrudes through the vertical wall 50a' and extends to the entrance 66 to the cup 62. In an aspect, the reactor catalyst conduit 48' may deliver spent catalyst to the mixer 60 through the segment 48b' through the entrance 64 to the cup. In an aspect, the regenerator catalyst conduit 108' may deliver hot regenerated catalyst to the mixer 60 through segment 108b' through entrance 66 to the cup. Entrances 64 and 66 may simply be openings in the side of the cup 62 which may correspond to the inner diameter of the respective conduits 48' and 108'.

A transport gas which may be a combustion gas is provided by fluidizing gas line 55c originating from combustion gas supply 55 to propel the spent catalyst through segment 48b' to the catalyst mixer 60, specifically to the confined volume 61. A nozzle 57c directs the transport gas through the segment 48b' of the reactor catalyst conduit 48. A transport gas which may be a combustion gas is provided by transport gas line 55d to propel the recycle catalyst through segment 108b' to the catalyst mixer 60, specifically to the confined volume 61. A nozzle 57d directs the transport gas through the segment 108b of the reactor catalyst conduit 48. Combustion gas added via gas lines 55c and 55d may account for about 10-20 wt-% of the gas to the combustor regenerator vessel 50.

As explained with respect to FIG. 2, the distributor 80 does not distribute combustion gas to the central region of the lower chamber 54 above the cap 84 of the combustion gas riser 82. The open end of the cup 62 may be vertically aligned with the cap 84. By using combustion gas to urge catalyst through segments 48b' and 108b', combustion of spent catalyst may begin in conduit 48' and combustion gas exiting from the bottom of the mixer 60 with the mixed catalyst enters into the central region to provide combustion gas to catalyst located in the central region.

Indeed, fluidizing gas may be used in the reactor catalyst conduit 48 and recycle catalyst conduit 108 of FIG. 1. If the fluidizing gas is a combustion gas it may provide the same distribution of combustion gas to the central region as above explained with respect to FIG. 3.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A process for regenerating catalyst comprising:
delivering spent catalyst having coke deposits to a regenerator vessel;
distributing oxygen to a regenerator vessel;
contacting said oxygen with said spent catalyst to combust coke deposits from said spent catalyst to produce regenerated catalyst and flue gas;
separating said flue gas from said regenerated catalyst;
recycling regenerated catalyst to a cup in said regenerator vessel; and mixing spent catalyst with regenerated catalyst in said cup, from which mixed regenerated and spent catalyst exits downwardly.

2. The process for regenerating catalyst of claim 1, wherein said spent catalyst is delivered to a cup in said regenerator vessel.

3. The process of claim 1 wherein said contacting of said oxygen with said spent catalyst is conducted in a first chamber and further comprising transporting said regenerated catalyst and flue gas from said first chamber into a second chamber and said separation of regenerated catalyst and flue gas is conducted in said second chamber.

4. The process of claim 3 wherein said regenerated catalyst from second chamber is recycled to said cup in said first chamber.

5. The process of claim 1 further comprising propelling regenerated catalyst to said cup with transport gas.

6. The process of claim 1 further comprising:
delivering said spent catalyst having coke deposits and regenerated catalyst to said cup in said regenerator vessel;
wherein said mixing of said spent catalyst and said regenerated catalyst in said cup provides mixed catalyst;
wherein said oxygen is distributed to said regenerator vessel below said cup; and
further comprising allowing said mixed catalyst to descend from said cup.

7. The process of claim 6 wherein said contacting of said oxygen with said spent catalyst is conducted in a first chamber and further comprising transporting said regenerated catalyst and flue gas from said first chamber into a second chamber and said separation of regenerated catalyst and flue gas is conducted in said second chamber.

8. The process of claim 7 wherein said regenerated catalyst from second chamber is recycled to said cup in said first chamber.

9. The process of claim 6 further comprising propelling regenerated catalyst to said cup with transport gas.

10. The process of claim 6 further comprising propelling spent catalyst to said cup with transport gas.

* * * * *